(12) United States Patent
Judd

(10) Patent No.: US 7,366,797 B2
(45) Date of Patent: Apr. 29, 2008

(54) DATA STORAGE SYSTEM WITH SHARED CACHE ADDRESS SPACE

(75) Inventor: Ian D. Judd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 11/243,845

(22) Filed: Oct. 5, 2005

(65) Prior Publication Data

US 2006/0230197 A1    Oct. 12, 2006

(30) Foreign Application Priority Data

Apr. 8, 2005    (GB) .................................. 0507160.0

(51) Int. Cl.
*G06F 3/00* (2006.01)
*G06F 12/00* (2006.01)
(52) U.S. Cl. .................... 710/2; 711/2; 711/6; 711/112; 709/250
(58) Field of Classification Search ................ 709/250; 710/2–7, 22, 33; 711/2–6, 112–117
See application file for complete search history.

(56) References Cited

U.S. PATENT DOCUMENTS

| 5,127,094 | A | * | 6/1992 | Bono ............................ 711/2 |
| 5,341,493 | A | * | 8/1994 | Yanai et al. ................ 711/161 |
| 5,987,566 | A | * | 11/1999 | Vishlitzky et al. .......... 711/114 |
| 6,304,946 | B1 | * | 10/2001 | Mason, Jr. .................. 711/143 |
| 2004/0193796 | A1 | * | 9/2004 | Takamoto et al. .......... 711/113 |

* cited by examiner

*Primary Examiner*—Christopher Shin
(74) *Attorney, Agent, or Firm*—Dillon & Yudell LLP

(57) ABSTRACT

An apparatus for a node of a peer-to-peer network having a plurality of nodes comprises one or more I/O adapters; a cache component; one or more inter-node routing components; a memory mapping component for presenting to the I/O adapters a single address space mapped across a plurality of memory elements each associated with the cache component; and a direct memory access component for performing a memory operation on the memory elements via the memory mapping component on behalf of the I/O adapters.

5 Claims, 4 Drawing Sheets

DATA STORAGE SYSTEM WITH SHARED CACHE ADDRESS SPACE

PRIORITY CLAIM

This application claims priority of UK patent application No. GB0507160.0, filed on Apr. 8, 2005, and entitled, "Data Storage System with Shared Cache Address Space".

BACKGROUND OF THE INVENTION

1. Technical Field

The present invention relates to the field of computer data storage systems, and particularly to storage systems (for example, block storage controllers for a storage area network) requiring extended scalability.

2. Description of Prior Art

Modern storage systems provide increasing storage capacity to meet user demands from host computer system applications. Various storage device configurations are known and used to meet the demand for higher storage capacity, performance and availability.

An exemplary configuration according to the art is shown in FIG. 1. As shown in FIG. 1, one of the storage configurations that may be used to meet demands for increased capacity and reliability is the use of multiple smaller storage modules which are configured to ensure data integrity and continuous availability in case of failures. In such redundant systems, recovery from many types of failure can be automated within the storage subsystem itself due to the use of redundancy. An example of such a redundant subsystem comprises dual controllers with redundant arrays of inexpensive disks (RAID), shown in schematic form in FIG. 1 as 112 and 114.

Typical storage systems have two storage device controllers 108, 110, that manage the storage and provide upstream interfaces for I/O to the storage. The storage device controllers may manage, for example, an array of storage devices for one or more host systems. The storage controllers may be used to make the arrays of storage devices 112, 114, appear to a host system, 102, 104, to be a single, high capacity storage pool.

Many modern storage systems are configured in storage area networks with access to storage by host computers 102, 104, being controlled across communications links. A storage area network (SAN) is a network whose primary purpose is the transfer of data between computer systems, such as hosts 102, 104, and storage elements located in storage subsystems, for example, storage devices 112, 114. In a SAN, storage devices may be centralised and interconnected in a high-speed network that allows the establishment of communications between storage subsystems and host computers within the distance supported by the communication infrastructure. A SAN can be shared between hosts or dedicated to one host. It can be local, or can be extended over geographical distances.

SANs enable storage to be externalised from the hosts and centralised elsewhere. This allows storage and data to be shared among multiple hosts. Data sharing enables access of common data for processing by multiple computer platforms or hosts.

The host infrastructure of a SAN can include a mixture of host platforms. The storage infrastructure includes storage devices which are attached to the SAN network. SANs can interconnect storage interfaces together into many network configurations.

A typical SAN uses what is known as a fabric 106 to connect devices. A fabric is the term used to describe the infrastructure connecting hosts and storage subsystems using interconnect entities such as switches, routers, directors, hubs and gateways. The different types of interconnect entities allow networks of varying scale to be built.

Turning to the storage controllers, 108, 110, it is well known in the art for conventional controllers to comprise cache memories, in order to take advantage of electronic access speed. Such caches may be implemented, for example, in DRAM technology. In operation, the caches 116, 118, provide a temporary store for data associated with I/O requests received by controllers 108, 110.

The direct association of caches and I/O ports with individual controllers is typically a limiting factor in achieving scalability in the performance, capacity and host connectivity of a storage subsystem, and it would thus be desirable to provide an arrangement, apparatus, method or computer program which would alleviate this problem.

It is known to have pairings of controllers for higher availability with capability to access data through either controller, but these systems are inherently limited in the scalability of their capacity and performance. It would thus be further desirable to overcome this limitation.

SUMMARY OF THE INVENTION

In a first aspect, the present invention provides an apparatus for a node of a peer-to-peer network having a plurality of nodes, the apparatus comprising: one or more I/O adapters; a cache component; one or more inter-node routing components; a memory mapping component for presenting to said I/O adapters a single address space mapped across a plurality of memory elements each associated with the cache component; and a direct memory access component for performing a memory operation on said memory elements via said memory mapping component on behalf of said I/O adapters.

Preferably, the I/O adapter comprises a host system adapter.

Preferably, the I/O adapter comprises a data storage device adapter.

Preferably, the network comprises a Fiber Channel fabric.

Preferably, the network comprises a Storage Area Network.

Preferably, the Storage Area Network comprises a storage virtualization controller.

The apparatus preferably comprises logic apparatus, and the logic apparatus preferably comprises programmable logic elements.

Preferably, the data storage device adapter is cooperable with a storage array.

Preferably, the storage array comprises a RAID array.

In a second aspect, the present invention provides a method of operating a node in a peer-to-peer network of nodes, the node comprising one or more I/O adapters, a cache component and a memory mapping component; the method comprising the steps of: presenting to said I/O adapter, by a memory mapping component, a single address space mapped across a plurality of memory elements each associated with the cache component; and performing a memory operation on said memory elements, by a direct memory access component, via said memory mapping component on behalf of said I/O adapter.

Preferably, the I/O adapter comprises a host system adapter.

Preferably, the I/O adapter comprises a data storage device adapter.

Preferably, the network comprises a Fiber Channel fabric.

Preferably, the network comprises a Storage Area Network.

Preferably, the Storage Area Network comprises a storage virtualization controller.

The apparatus preferably comprises logic apparatus, and the logic apparatus preferably comprises programmable logic elements.

Preferably, the data storage device adapter is cooperable with a storage array.

Preferably, the storage array comprises a RAID array.

In a third aspect, the present invention provides a computer program comprising computer program code to, when loaded into a computer system and executed thereon, cause said computer to perform the steps of the method according to the second aspect. Preferred steps of the method of the second aspect are preferably implemented in program code steps of the third aspect.

The present invention thus provides a method of scaling the performance, capacity and host connectivity of a storage subsystem by coupling a number of modular controllers together in a peer-to-peer network in which a cache memory address space may be commonly addressed.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purpose and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
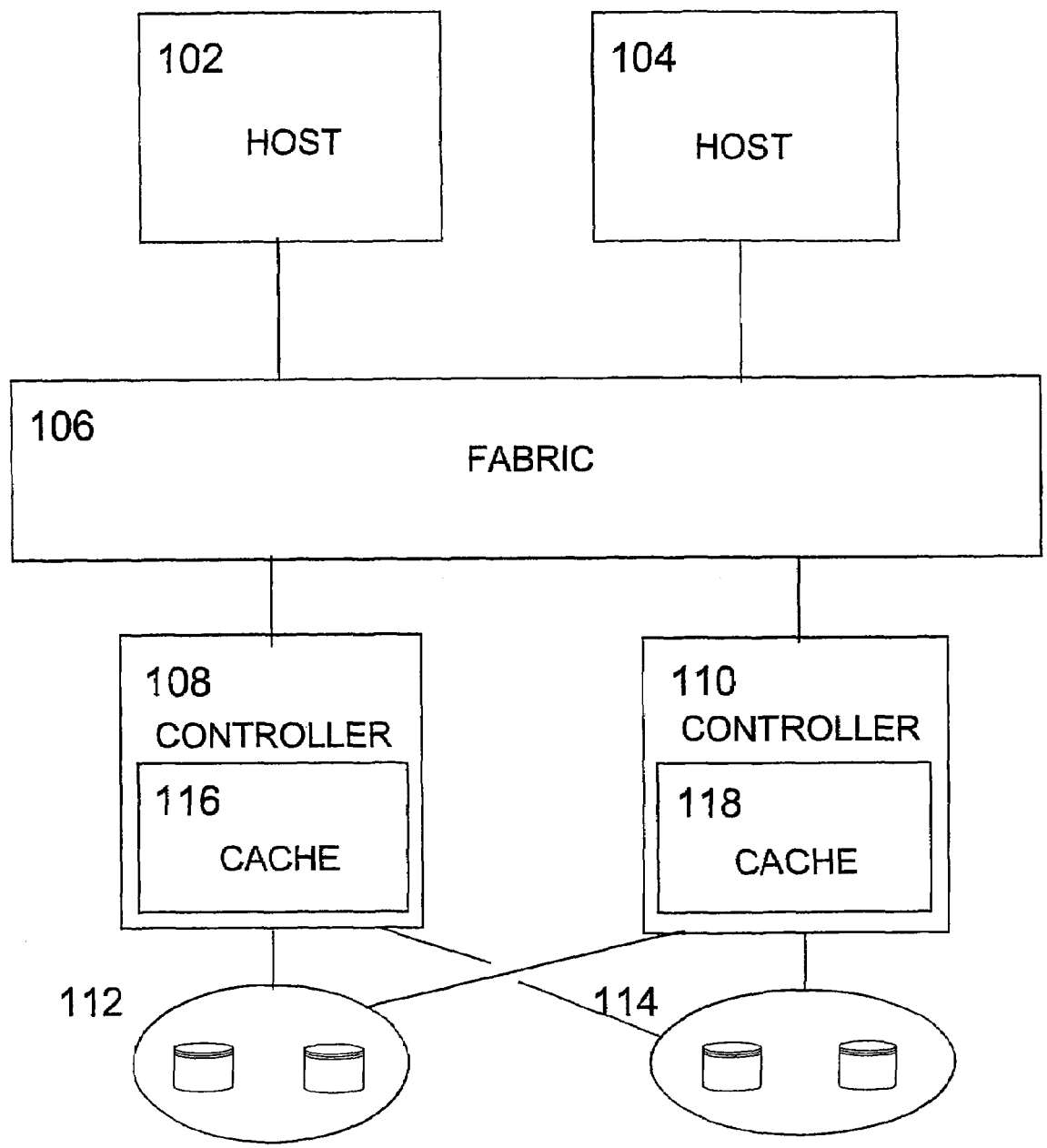
FIG. 1 shows a typical storage subsystem configuration containing a pair of redundant controllers according to the prior art.

In FIG. 1 is shown a typical storage subsystem configuration having hosts, a fabric, a pair of controllers with caches and storage devices, according to the prior art as described herein above.

Figure 2:
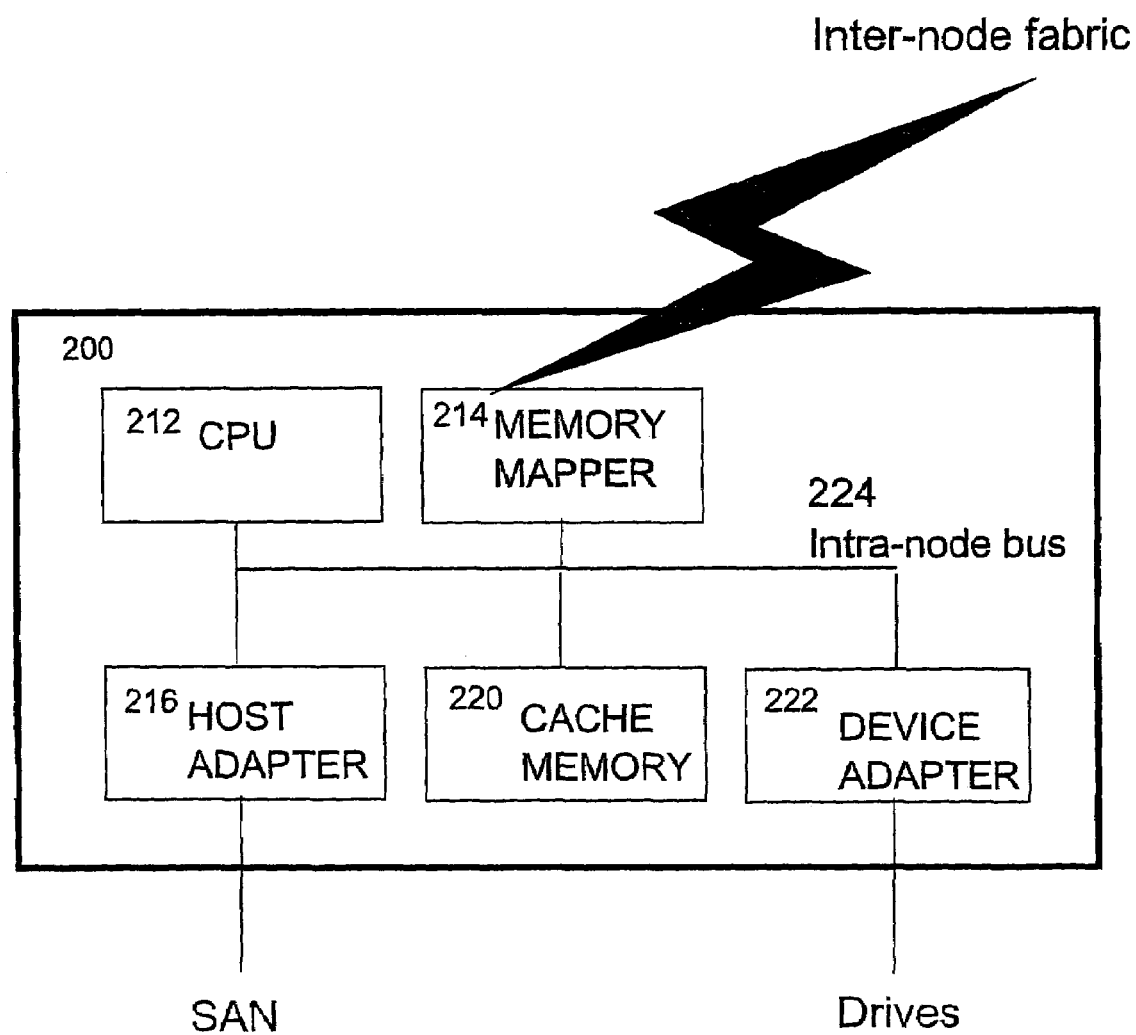
FIG. 2 shows an apparatus according to a preferred embodiment of the present invention.

In FIG. 2 is shown an apparatus 200 according to a preferred embodiment of the present invention. Node 200 is operable in a peer-to-peer network (not shown) and comprises a Host adapter 216, a cache memory 220, a Device adapter 222 and a CPU 212. The I/O adapters 216 and 222, the cache memory 220 and the CPU 212 are linked by an intra-node bus 224.

Memory mapping component 214 is operable to present to the I/O adapters 216 and 222 a single address space mapped across a plurality of cache memories 220, each owned by one of said plurality of nodes. Each I/O adapter contains a direct memory access component for performing memory operations on the cache memories 220 via the intra-node bus or via the memory mapping component 214 and the inter-node fabric.

The apparatus is preferably embodied as a controller device in which the hardware and software functions according to the preferred embodiment are separated into three layers. The Host Adapter (HA)—one exemplary instance of the I/O adapter of the preferred embodiment—handles the interface to, for example, a storage area network, or SAN. The CAche (CA) layer contains the cache, copy services, virtualization and data migration functions. Each virtual disk is owned by one or more instances of the CA layer. The Device Adapter (DA)—a further exemplary instance of the I/O adapter of the preferred embodiment—contains the RAID functions and the interface to the drives. Each physical array is owned by one or more instances of the DA layer.

Multiple controllers may be coupled together via an inter-node fabric. The fabric preferably supports a shared memory model which allows any instance of the HA and DA hardware to transfer data directly to/from any instance of the CA memory. The fabric also supports a message delivery system which allows any instance of the HA, CA and DA functions to communicate with any other function.

Figure 3:
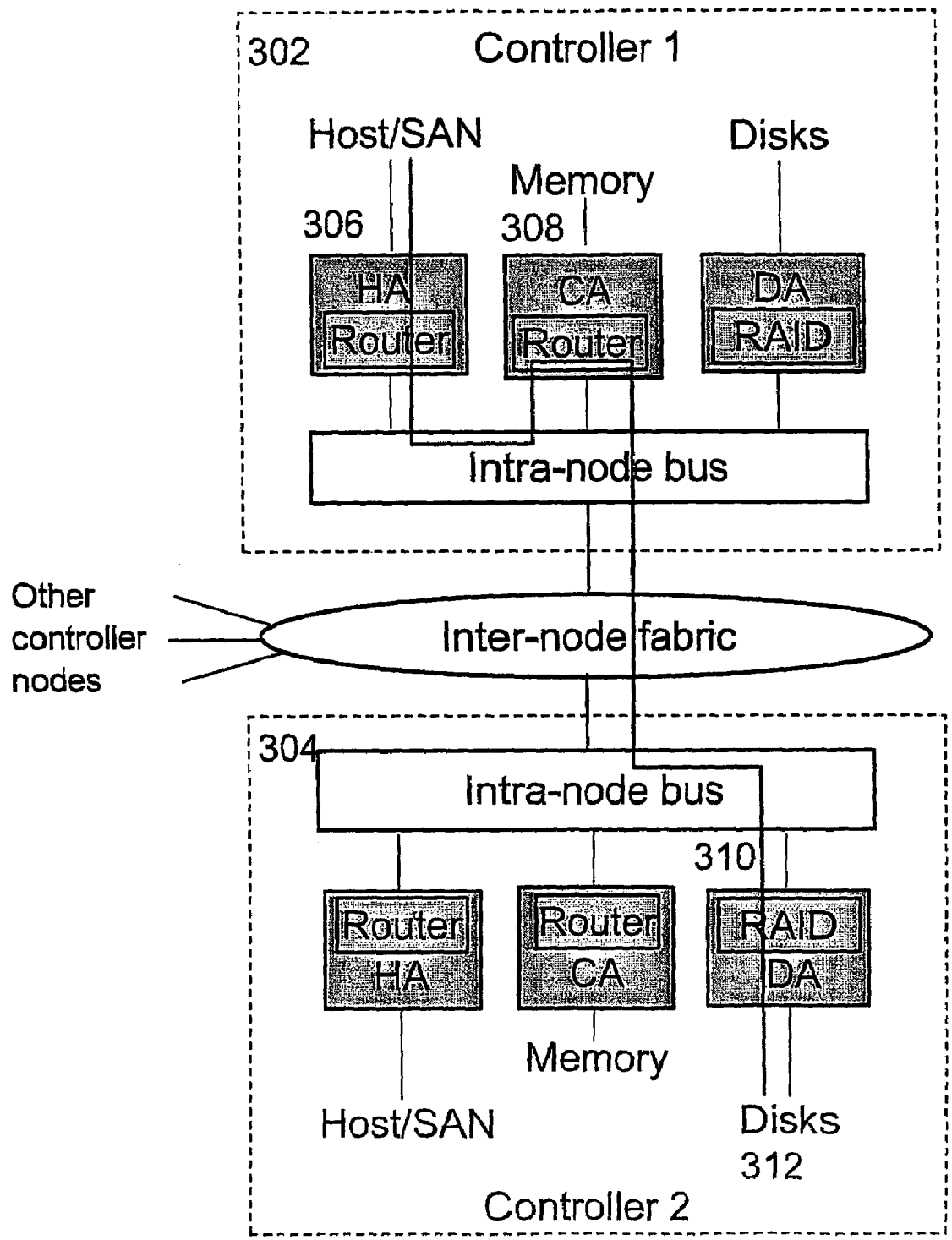
FIG. 3 shows one exemplary arrangement of apparatus comprising a communicating pair of controllers according to this preferred embodiment.

FIG. 3 shows one exemplary arrangement of apparatus comprising two communicating controllers 302, 304 according to this preferred embodiment. Each controller 302, 304 would normally be paired with another redundant controller for higher availability but the redundant controllers are not shown in FIG. 3 for simplicity.

The HA 306 contains a routing component which directs each I/O request to a particular CA layer 308 that owns the addressed virtual disk. Similarly the CA 308 contains a routing component which directs each I/O request to a DA layer 310 that owns the addressed physical array 312.

In this exemplary arrangement, there may be provided a method of operation of an apparatus operable in a peer-to-peer network of nodes, each node comprising one or more I/O adapters, a cache memory and a memory mapping component. The method comprises the steps of presenting to the I/O adapter, by a memory mapping component, a single address space mapped across a plurality of cache memories each owned by one of the nodes; and performing a memory operation on the cache memories, by direct memory access, via the intra-node bus or via the memory mapper and the inter-node fabric on behalf of the I/O adapter.

The features of the preferred embodiment support zero-copy data transfers and internal routing of I/O requests with low overheads.

Figure 4:
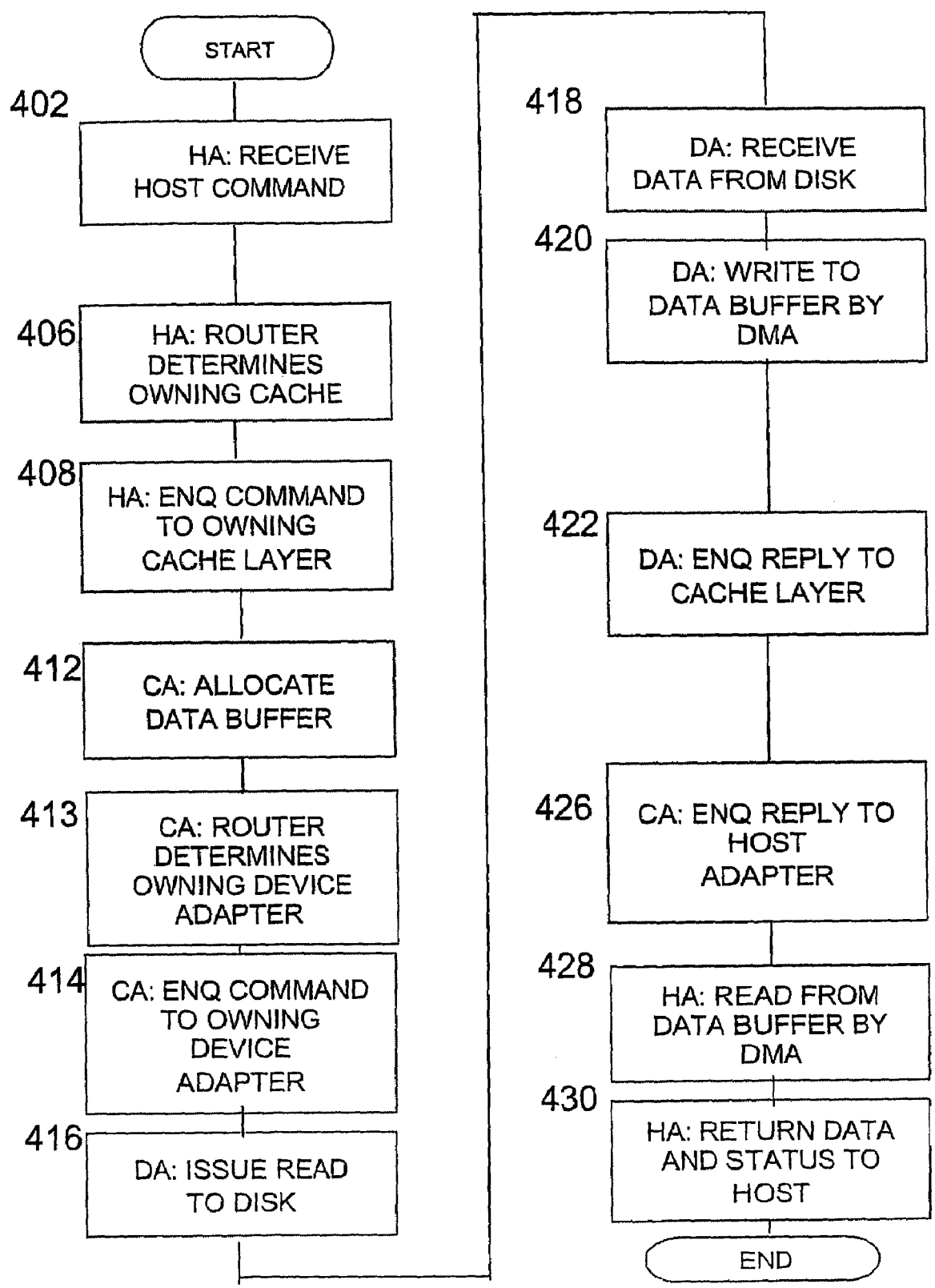
FIG. 4 shows a method of operation of an arrangement of apparatus according to the preferred embodiment.

FIG. 4 shows one method of operation of an exemplary arrangement comprising a communicating pair of controllers according to the preferred embodiment, which operates in response to, for example, a read request received from a host according to the following pseudo-code:

HA1 receives read command for a Virtual Disk
Router1 decodes virtual disk number & enq's request to CA1
  CA1 allocates buffer in CA1
  CA1 maps request to physical array & enq's request to DA2
    DA2 issues read to disk
    DA2 writes data to CA1 by DMA
    DA2 enq's reply to CA1
  CA1 enq's reply to HA1
HA1 reads data from CA1 by DMA
HA1 sends status to host It will be readily appreciated by those of ordinary skill in the art that a corresponding procedure applies, with appropriate modification, to other I/O requests, such as write requests.

Thus, a method of operating an arrangement according to a preferred embodiment may be generalised as follows.

An HA adapter attached to a host receives 402 a host command for a read operation to be performed from a virtual disk. The router decodes 406 the command and enqueues 408 the request to an owning cache layer. The cache layer allocates 412 a buffer in its cache. The router 413 enqueues 414 the remapped request to the appropriate device adapter, which issues a read 416 to a disk.

The device adapter receives 418 the data read from disk, writes 420 the data to the buffer in the cache by DMA, using the single address space provided by the memory mapping component, and enqueues 422 the reply to the cache layer. The cache layer enqueues 426 the reply to the host adapter. The host adapter reads 428 the data from the buffer in the cache by DMA and returns 430 data and status to the host.

In this example, both the host I/O adapter and the device I/O adapter are operable in cooperation with the fabric and devices according to embodiments of the present invention, thus providing bi-directional zero-copy transfer of data between storage devices and hosts via DMA operations on a cache buffer.

It will be readily appreciated by those of ordinary skill in the art that the preferred embodiments of the present invention may be implemented in, for example, a storage controller arranged to operate in a network of apparatus, and may comprise a storage area network controller, for example.

It will be clear to one skilled in the art that the method of the present invention may suitably be embodied in a logic apparatus comprising logic means to perform the steps of the method, and that such logic means may comprise hardware components or firmware components.

It will be equally clear to one skilled in the art that the logic arrangement of the present invention may suitably be embodied in a logic apparatus comprising logic means to perform the steps of the method, and that such logic means may comprise components such as logic gates in, for example, a programmable logic array. Such a logic arrangement may further be embodied in enabling means for temporarily or permanently establishing logical structures in such an array using, for example, a virtual hardware descriptor language, which may be stored using fixed or transmittable carrier media.

It will be appreciated that the method described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may thus suitably be embodied, in full or in part, as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

It should be understood that at least some aspects of the present invention may alternatively be implemented in a computer-usable medium that contains a program product. Programs defining functions in the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD-ROM, optical media), and communication media, such as computer and telephone networks including Ethernet, the Internet, wireless networks, and like network systems. It should be understood, therefore, in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware ad described herein or their equivalent.

While the present invention has been particularly shown and described with reference to a preferred embodiment, it will be understood by those skilled in the art that various changes in form and detail may be made therein without departing from the spirit and scope of the invention.

It will also be appreciated that various further modifications to the preferred embodiment described above will be apparent to a person of ordinary skill in the art.

What is claimed is:

1. A method comprising:
   in response to a receiving host adapter receiving a read command directed to a virtual disk location from a requesting host, allocating a buffer in a cache memory corresponding to said receiving host adapter;
   determining an identity of a physical disk array corresponding to said virtual disk location;
   in response to determining said identity of said physical disk array location, writing data associated with said read command to said buffer;
   in response to said writing said data, reading said data from said buffer; and
   in response to said reading said data, sending said data to said requesting host.

2. The method according to claim 1, wherein said writing said data further comprises:
   writing said data to said buffer utilizing a direct memory access.

3. The method according to claim 1, wherein said reading said data further comprises:
   reading said data from said buffer utilizing a direct memory access.

4. The method according to claim 1, further comprising:
   determining an identity of said cache adapter corresponding to said receiving host adapter.

5. The method according to claim 4, further comprising:
   in response to determining said cache layer corresponding to said receiving host adapter, enqueuing a request to allocate a buffer in said cache memory.

* * * * *